United States Patent
Books (10) Patent No.: US 10,731,619 B2
(45) Date of Patent: *Aug. 4, 2020

(54) MANAGING AUTOMATIC STOP/START FREQUENCY (71) Applicant: Cummins, Inc., Columbus, IN (US)

(72) Inventor: Martin T. Books, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/362,249

(22) Filed: Mar. 22, 2019

(65) Prior Publication Data

US 2019/0219018 A1    Jul. 18, 2019

Related U.S. Application Data

(63) Continuation of application No. 15/737,991, filed as application No. PCT/US2015/038280 on Jun. 29, 2015, now Pat. No. 10,240,571.

(51) Int. Cl.
   *F02N 11/08*    (2006.01)
   *F02N 11/10*    (2006.01)

(52) U.S. Cl.
   CPC ...... *F02N 11/0825* (2013.01); *F02N 11/0818* (2013.01); *F02N 11/108* (2013.01);
   (Continued)

(58) Field of Classification Search
   CPC ............... F02N 11/0825; F02N 11/108; F02N 11/0818; F02N 2200/061; F02N 2200/14;
   (Continued)

(56) References Cited

U.S. PATENT DOCUMENTS 6,752,741 B2    6/2004    Kahlon et al.
8,175,791 B2    5/2012    Lecole et al.
(Continued)

FOREIGN PATENT DOCUMENTS

DE    10 2007 024 352    11/2008
DE    10 2009 048 262     4/2011
(Continued)

OTHER PUBLICATIONS

International Search Report and Written Opinion for International Application No. PCT/US2015/038280, dated Sep. 30, 2015, 9 pages.
(Continued)

*Primary Examiner* — Hai H Huynh
(74) *Attorney, Agent, or Firm* — Foley & Lardner LLP (57) ABSTRACT

Systems, apparatuses, and methods include a stop/start module in operative communication with an engine. The stop/start module is configured to determine a target start/stop ratio for an engine based on an operating parameter, determine an actual start/stop ratio for the engine based on a determined number of times that the engine is turned off in response to a determined number of stopping events, activate an inhibiting condition in response to the actual stop ratio being greater than the target stop ratio at a beginning of a driving event, and prevent the engine from turning off during a stop event in response to determining that the inhibiting condition is active and that a stopping event has occurred.

20 Claims, 5 Drawing Sheets

(52) U.S. Cl.
CPC .. *F02N 2200/023* (2013.01); *F02N 2200/026* (2013.01); *F02N 2200/061* (2013.01); *F02N 2200/14* (2013.01); *Y02T 10/48* (2013.01)

(58) Field of Classification Search
CPC ......... F02N 2200/023; F02N 2200/026; Y02T 10/48
USPC ................... 123/179.3, 179.4; 701/112, 113
See application file for complete search history.

(56) References Cited

U.S. PATENT DOCUMENTS

| | | | |
|---|---|---|---|
| 8,290,691 B2 | 10/2012 | Lin et al. | |
| 10,240,571 B2 * | 3/2019 | Books | F02N 11/0818 |
| 2002/0157414 A1 | 10/2002 | Iwanami et al. | |
| 2006/0009325 A1 | 1/2006 | Ohtake et al. | |
| 2009/0308148 A1 | 12/2009 | Lee | |
| 2010/0152995 A1 | 6/2010 | Baumann et al. | |
| 2011/0014621 A1 | 1/2011 | Adler, Jr. | |
| 2014/0046578 A1 | 2/2014 | Balzer et al. | |
| 2014/0088854 A1 | 3/2014 | Smague | |
| 2015/0075490 A1 | 3/2015 | Hull et al. | |

FOREIGN PATENT DOCUMENTS

| | | |
|---|---|---|
| EP | 2 685 070 A1 | 1/2014 |
| GB | 2 494 648 | 3/2013 |
| JP | 2010-281237 A | 12/2010 |
| WO | WO-01/94778 A1 | 12/2001 |
| WO | WO-2011/048338 A1 | 4/2011 |

OTHER PUBLICATIONS

Extended European Search Report for European Application No. 15897311.5, dated Jun. 7, 2019, 9 pages.

* cited by examiner

MANAGING AUTOMATIC STOP/START FREQUENCY

CROSS REFERENCES TO RELATED PATENT APPLICATIONS

This application is a continuation of U.S. patent application Ser. No. 15/737,991 filed Dec. 19, 2017, which is a U.S. National Stage Application of PCT Application No. PCT/US2015/038280 filed Jun. 29, 2015, each of which are incorporated herein by reference in their entirety.

BACKGROUND

Many vehicles are powered by an engine that consumes fuel to power the vehicle. Oftentimes, vehicle engines remain in an idle operating state even when the vehicle is not moving (e.g., when a vehicle is stopped at a stop sign, in a drive through, in stop-and-go traffic etc.). In such situations, fuel is still consumed by the engine even though the vehicle is not moving. Some vehicles address this problem by employing a stop/start system that automatically shuts down and restarts the engine under certain operating conditions to reduce the amount of fuel consumed by the engine. For example, an engine may be shut off when the vehicle remains in idle for extended periods of time, such as when the vehicle is stopped in a traffic jam, stopped at a train crossing, or placed in park. Stop/start features are typically combined with automatic engine restart. For example, an engine may automatically restart when a condition suggests the need to resume engine torque production (e.g., pressing the accelerator pedal, changing the vehicle from park to drive, etc.). Stop/start features may be used by any vehicle having an engine, including gas powered vehicles, electric powered vehicles, and hybrid vehicles.

SUMMARY

One embodiment relates to an apparatus. The apparatus includes a stop/start module in operative communication with an engine. The stop/start module is structured to determine whether a stopping event has occurred, determine whether an inhibiting condition is activated, turn off the engine for at least a portion of time in response to determining that a stopping event has occurred, and determine an actual stop ratio for the engine based on a number of times the engine is turned off in response to determining the occurrences of stopping events. Turning off the engine is inhibited in response to determining that an inhibiting condition is activated. The inhibiting condition is activated based on any number of criteria such as engine temperature, battery charge, or other vehicle loads. If an inhibiting condition is activated at a beginning of a driving event, the duration of the inhibiting condition is extended past the actual inhibiting criteria based on the actual stop ratio for the engine being greater than a target stop ratio. The target stop ratio is based on an operating parameter.

Another embodiment relates to a method. The method includes determining whether a stopping event has occurred, temporarily turning off an engine for at least a portion of time in response to determining that a stopping event has occurred, determining an actual stop ratio for the engine based on a number of times the engine is temporarily turned off in response to determining the occurrences of stopping events and at least one of a distance traveled, an expected life of the engine in hours since purchase date, and a number of hours of operation of the engine, and inhibiting the engine from temporarily turning off based on an inhibiting condition. The inhibiting condition is based on any number of criteria. If an inhibiting condition is present at a beginning of a driving event, the duration of the inhibiting condition is extended based on the actual stop ratio for the engine being greater than a target stop ratio.

Another embodiment relates to a system. The system includes an engine and a controller communicably coupled to the engine. The controller is structured to determine whether a stopping event has occurred, temporarily turn off the engine for at least a portion of time in response to determining that a stopping event has occurred, determine an actual stop ratio for the engine based on a number of times the engine is temporarily turned off in response to determining the occurrences of stopping events, and inhibit the engine from temporarily turning off based on an inhibiting condition. The inhibiting condition is based on any number of criteria. If an inhibiting condition is present at a beginning of a driving event, the duration of the inhibiting condition is extended based on the actual stop ratio for the engine being greater than a target stop ratio.

These and other features, together with the organization and manner of operation thereof, will become apparent from the following detailed description when taken in conjunction with the accompanying drawings.

DETAILED DESCRIPTION

Following below are more detailed descriptions of various concepts related to, and implementations of, methods, apparatuses, and systems for managing automatic stop/start frequency by enabling or disabling a stop/start feature. The various concepts introduced above and discussed in greater detail below may be implemented in any number of ways, as the concepts described are not limited to any particular manner of implementation. Examples of specific implementations and applications are provided primarily for illustrative purposes.

Referring to the Figures generally, the various embodiments disclosed herein relate to systems, apparatuses, and methods of enabling or disabling an automatic stop/start feature of an engine based on various operating conditions and operating parameters. Engine starting can be one of the most detrimental operating modes of an engine. When an engine is started, bearings within the engine have little or no lubrication and may experience excessive wear. After initially starting, the engine undergoes a warm-up period where the engine may experience high temperature transients.

Furthermore, during the warm-up period, emission control devices, such as an exhaust gas aftertreatment system, may perform sub-optimally. Also during warm-up, engine lubricant (e.g., oil, etc.) may remain fairly viscous such that a high torque is required to restart the engine, which requires more electrical power. An engine may also be damaged by being shut down when the engine is too hot. For example, after prolonged periods of high-powered operation, portions of the engine may take a finite amount of time to adequately cool even when using a cooling system (e.g., a radiator, a water pump, etc.). Engine damage may also occur if an automatic stop occurs before the engine has sufficiently cooled down, for example, by the occurrence of heat soak-back. Accordingly, it will be appreciated that a stop/start feature should, in some cases, be disabled or temporarily refrained from stopping or starting the engine based on a characteristic of the engine, a current state of the engine, an operating condition of the engine, and so on. Further, engine stop and restart may be disabled for a period of time to limit the number of stop/start events an engine may experience over its operating life.

In pursuing fuel economy improvements in automotive vehicles, engine idle time may be reduced through systems and methods that automatically shut down and restart the engine. Such systems and methods typically shut down the engine whenever the vehicle is not moving and automatically restart the engine when a driver input indicates a desire to launch or otherwise continue driving. However, excessively shutting down and restarting an engine causes excessive wear and affects the durability and useful life of the engine as engine starting may be one of the harshest operational modes of the engine. During initial cranking of the engine, bearing and camshaft lubrication as well as piston-ring/cylinder-wall contact are minimal or non-existent. Furthermore, some engines may be designed to survive an assumed number of start events over the engine's life, which may be based on presumed drive cycles that include only a single start per driving event. Accordingly, an engine configured to automatically stop and then be restarted may have a high risk of premature failures if the stop and restart frequency is substantially high. These risks may be remedied by improving the durability of engine hardware, which in turn may increase costs. One alternative is to limit the number of stops and restarts over the life of the engine.

The number of or frequency of stop/start events may be limited based on a time limit between subsequent stop and restart events. For example, a design-limited maximum number of start events for an engine may suggest a maximum average of thirty starts per hour of operation over the life of the engine. An engine shutdown may then be inhibited if the engine shutdown would occur sooner than two minutes after a previous shutdown or a previous restart. One drawback to this approach is that the operator may observe (or think they observe) inconsistency in the behavior of the stop/start logic. For example, the operator may not be able to tell the difference between a stop in which the engine shuts down and a stop in which the engine does not shut down, which may lead the operator to assume that the stop/start feature is inconsistent or not working properly. Unless the vehicle operator is aware of the time limit, the operator may not understand the stop/start pattern or understand the stop/start logic, particularly if the operator's drive cycle significantly varies day-to-day.

Embodiments of the inventive concepts disclosed herein are directed to performing cumulative engine stop corrections (e.g., inhibiting the stop/start functionality of an engine, etc.) during periods when a stop/start feature may normally be inhibited, such as during and immediately following an engine warm-up period. By consistently inhibiting the automatic stopping and restarting of an engine during and as an extension of the engine warm-up period, the operator of the vehicles may become accustomed to the engine stop/start feature being inhibited during this time and will not expect the engine to automatically stop and restart. Also, enabling automatic engine shutdowns after the engine has warmed-up causes the engine to crank with relatively lower torque requirements (e.g., reduced friction when the engine is warm, etc.) and other advantages. For example, the stop/start inhibiting period may be extended to correct for the cumulative number of engine stops per hour of operation or distance traveled, an expected life of the engine in hours since purchase date, and/or an expected of the engine in operating hours. Various corrective timetables may be employed and the time between automatic shutdown events may be managed in an effort to keep total start events for the life of the engine on a predetermined trajectory. In some embodiments, automatic stops may be inhibited as long as the engine is operating above a desired durability trajectory (e.g., an actual stop ratio is greater than a target stop ratio, etc.), and these inhibiting events may be concentrated as extensions of the engine warm-up period. According to an example embodiment, the implementation of an automatic stop/start feature is based on criteria which indicate an inhibiting condition is not present.

In some embodiments, the inhibiting criteria is not limited to an absolute total number of engine starts over the life of the engine. For example, restarting events implemented by the stop/start logic may tax the robustness of the engine hardware beyond the number of starting events an engine is designed for. In one embodiment, the inhibiting criteria may limit the number of automated restarts incurred due to the stop/start logic (e.g., any restart as a direct result of an automated stop, not accounting for a manual start or stop, etc.). For example, manual starts and stops (e.g., an operator turning a key to start or stop the engine, etc.) may be ignored and not counted as a stop and restart event. Similarly, other starts that may not tax the robustness of the engine may be ignored. For example, some stop and restart events may be relatively brief such that the fluid pressure in the engine's lubrication system does not decay to a low pressure (i.e., minimizing the negative consequences of a subsequent restart, etc.). In another example, some engine systems may include other technologies designed to mitigate certain negative effects of engine starting such that some stop and restart events may not be included in the accounting of the number of stop and restart events that the engine experiences.

Figure 1:
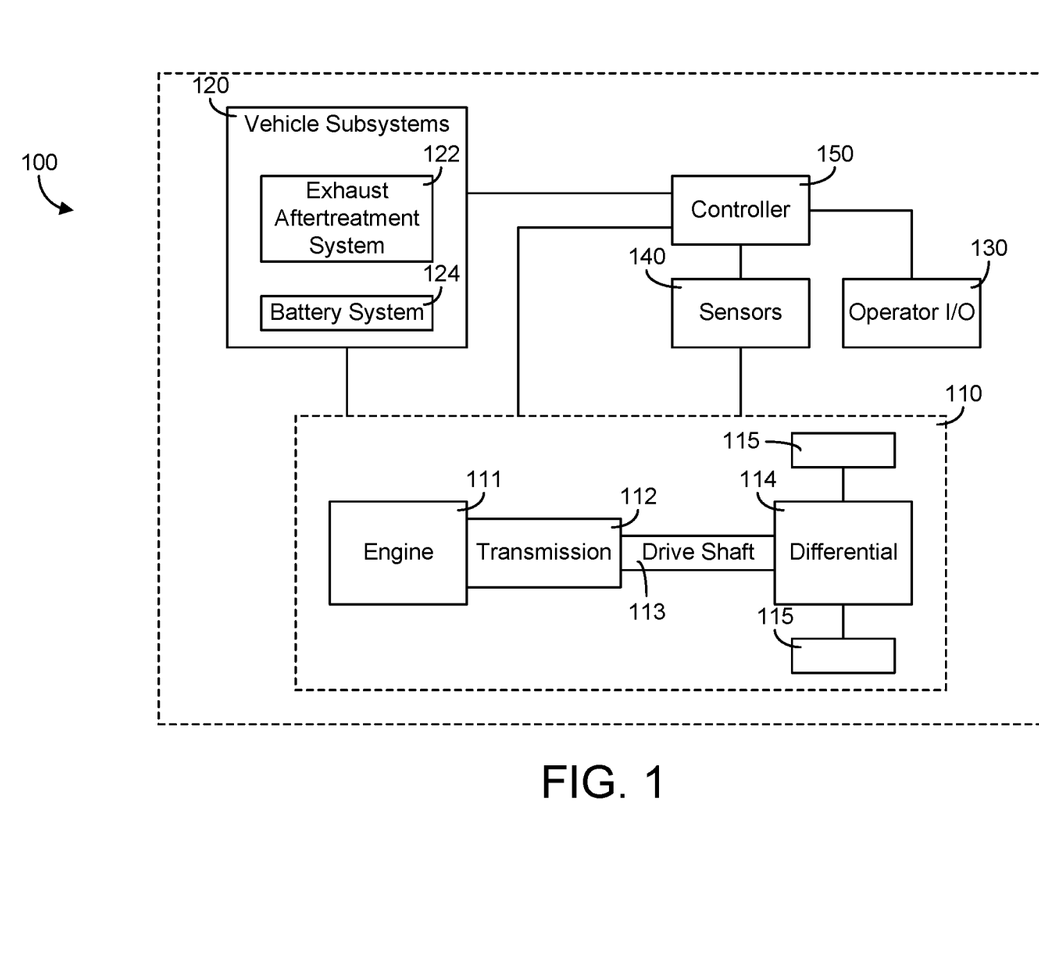
FIG. 1 is a schematic diagram of a vehicle with a controller, according to an example embodiment.

Referring now to FIG. 1, a schematic diagram of a vehicle 100 with a controller 150 is shown according to an example embodiment. The vehicle 100 may be an on-road or an off-road vehicle including, but not limited to, line-haul trucks, mid-range trucks (e.g., pick-up truck), cars (e.g., sedans, hatchbacks, coupes, etc.), and any other type of vehicle which may include a stop/start feature that automatically shuts down an engine and then restarts the engine after a period of time. Although FIG. 1 depicts the vehicle 100 as including an internal combustion engine 111, the vehicle 100 may be powered by any type of engine system. For example, the vehicle 100 may be a hybrid vehicle, a full electric vehicle, a hydrogen powered vehicle, and/or a vehicle powered by an internal combustion engine.

As shown in FIG. 1, the vehicle 100 generally includes a powertrain system 110, vehicle subsystems 120, an operator input/output (I/O) device 130, sensors 140 communicably coupled to one or more components of the vehicle 100, and a controller 150. These components are described more fully herein.

Components of the vehicle 100 may communicate with each other or foreign components using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, etc. In one embodiment, a controller area network (CAN) bus provides the exchange of signals, information, and/or data. The CAN bus includes any number of wired and wireless connections. Because the controller 150 is communicably coupled to the systems and components in the vehicle 100 of FIG. 1, the controller 150 is structured to receive data regarding one or more of the components shown in FIG. 1. For example, the data may include operation data regarding the operating conditions (e.g., engine temperature data, exhaust aftertreatment temperature data, energy temperature data, etc.) of the engine 111 and/or other components (e.g., an exhaust aftertreatment system, a battery system, etc.) acquired by one or more sensors, such as sensors 140. As another example, the data may include an input from operator I/O device 130. As described more fully herein, the controller 150 may determine when it is permissible to enable the stop/start feature based on the operation data and operating parameters.

As shown in FIG. 1, the powertrain system 110 includes an engine 111, a transmission 112, a drive shaft 113, a differential 114, and a final drive 115. As a brief overview, the engine 111 receives a chemical energy input (e.g., a fuel such as gasoline, diesel, etc.) and combusts the fuel to generate mechanical energy, in the form of a rotating crankshaft. The transmission 112 receives the rotating crankshaft and manipulates the speed of the crankshaft (e.g., the engine revolutions-per-minute (RPM), etc.) to affect a desired drive shaft speed. The rotating drive shaft 113 is received by the differential 114, which provides the rotation energy of the drive shaft 113 to the final drive 115. The final drive 115 then propels or moves the vehicle 100.

The engine 111 may be structured as any engine type, including an internal combustion engine, and a full electric motor, among other alternatives. As shown, the engine 111 may be structured as any internal combustion engine (e.g., compression-ignition, spark-ignition, etc.) and may be powered by any fuel type (e.g., diesel, ethanol, gasoline, etc.). Similarly, the transmission 112 may be structured as any type of transmission, such as a continuous variable transmission, a manual transmission, an automatic transmission, an automatic-manual transmission, a dual clutch transmission, and so on.

Accordingly, as transmissions vary from geared to continuous configurations (e.g., continuous variable transmission), the transmission may include a variety of settings (gears, for a geared transmission) that affect different output speeds based on the engine speed. Like the engine 111 and the transmission 112, the drive shaft 113, differential 114, and final drive 115 may be structured in any configuration dependent on the application (e.g., the final drive 115 is structured as wheels in an automotive application and a propeller in a boat application, etc.). Further, the drive shaft 113 may be structured as any type of drive shaft including, but not limited to, a one-piece, two-piece, and a slip-in-tube driveshaft based on the application.

Referring still to FIG. 1, the vehicle 100 includes the vehicle subsystems 120. As shown in FIG. 1, the vehicle subsystems 120 may include an exhaust aftertreatment system 122. The exhaust aftertreatment system 122 may include any component used to reduce exhaust emissions, such as selective catalytic reduction (SCR) catalyst, a diesel oxidation catalyst (DOC), a diesel particulate filter (DPF), a diesel exhaust fluid (DEF) doser with a supply of diesel exhaust fluid, a plurality of sensors for monitoring the aftertreatment system (e.g., a nitrogen oxide (NOx) sensor, temperature sensors, etc.), and/or still other components. As shown in FIG. 1, the vehicle subsystems 120 may further include a battery system 124. The battery system 124 may include one or more batteries configured to operate various electrical based components of the vehicle 100 (e.g., while the engine 111 is running, while the engine 111 is off, etc.) and provide energy to start the engine 111 (e.g., in response to a restart command when the stop/start feature turns off the engine 111, when an operator keys on the engine 111, etc.).

The operator I/O device 130 may enable an operator of the vehicle 100 (or passenger) to communicate with the vehicle 100 and the controller 150. By way of example, the operator I/O device 130 may include, but is not limited to, an interactive display, a touchscreen device, one or more buttons and switches, voice command receivers, and the like. In one embodiment, the operator I/O device 130 includes a brake and an accelerator pedal which suggests the need to either end engine torque production with a stop feature (e.g., pressing the brake pedal such that the vehicle 100 comes to a stop, etc.) or resume engine torque production with a start feature (e.g., pressing the accelerator pedal from a stopped state, in response to a restart command, shifting from a park mode into a drive mode, etc.).

As the components of FIG. 1 are shown to be embodied in the vehicle 100, the controller 150 may be structured as an electronic control module (ECM). The ECM may include a transmission control unit and any other vehicle control unit (e.g., exhaust aftertreatment control unit, powertrain control module, engine control module, etc.). The function and structure of the controller 150 is described in greater detail in FIG. 2.

Figure 2:
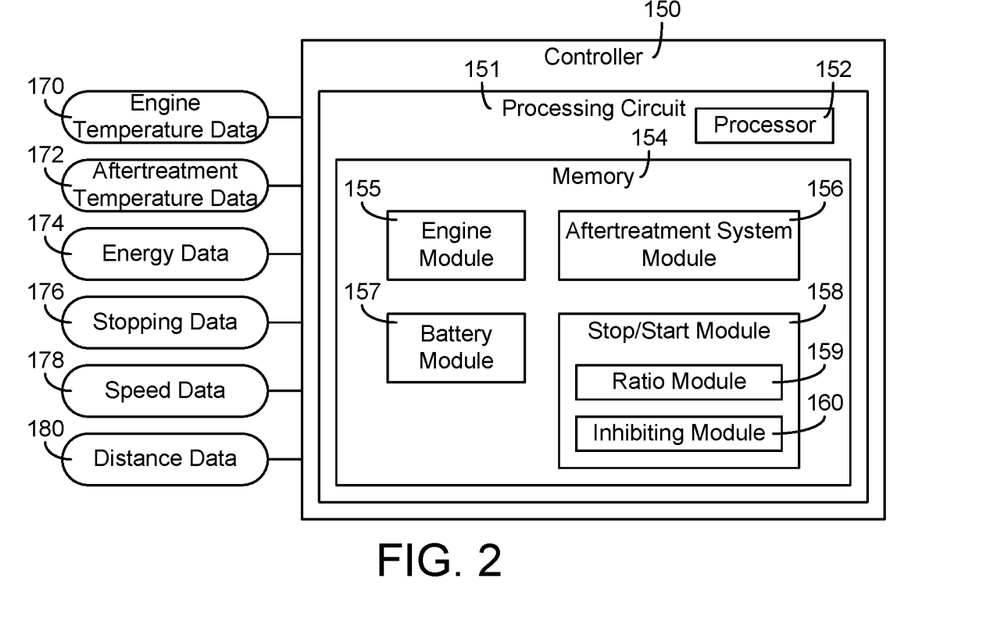
FIG. 2 is a schematic diagram of the controller of the vehicle of FIG. 1, according to an example embodiment.

Referring now to FIG. 2, a schematic diagram of the controller 150 of the vehicle of FIG. 1 is shown according to an example embodiment, including functional and structural components. As shown in FIG. 2, the controller 150 includes a processing circuit 151 including a processor 152 and a memory 154. The processor 152 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 154 (e.g., RAM, ROM, Flash Memory, hard disk storage, etc.) may store data and/or computer code for facilitating the various processes described herein. The one or more memory devices 154 may be communicably connected to the processor 152 and provide computer code or instructions to the processor 152 for executing the processes described in regard to the controller 150 herein. Moreover, the one or more memory devices 154 may be or include tangible, non-transient volatile memory or non-volatile memory. The one or more memory devices 154 may include database components, object code components, script components, or any other type of information structure for supporting the various activities and information structures described herein.

The memory 154 is shown to include various modules for performing the activities described herein. More particularly, as shown in FIG. 2, the memory 154 includes an engine module 155, an aftertreatment system module 156, a battery module 157, and a stop/start module 158. The various modules of the memory 154 are configured to determine whether to implement the stop/start feature based on an actual stop ratio being less than a target stop ratio at the beginning of an operating event (e.g., a driving event, etc.) and based on various operating conditions indicating that an inhibiting condition is not activated. While various modules with particular functionality are shown in FIG. 2, it will be understood that the controller 150 and memory 154 may include any number of modules for performing the functions described herein. For example, the activities of multiple modules may be combined as a single module, additional modules with additional functionality may be included, etc. Further, it should be understood that the controller 150 may control other vehicle activity beyond the scope of the present disclosure.

Certain operations of the controller 150 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Figure 3:
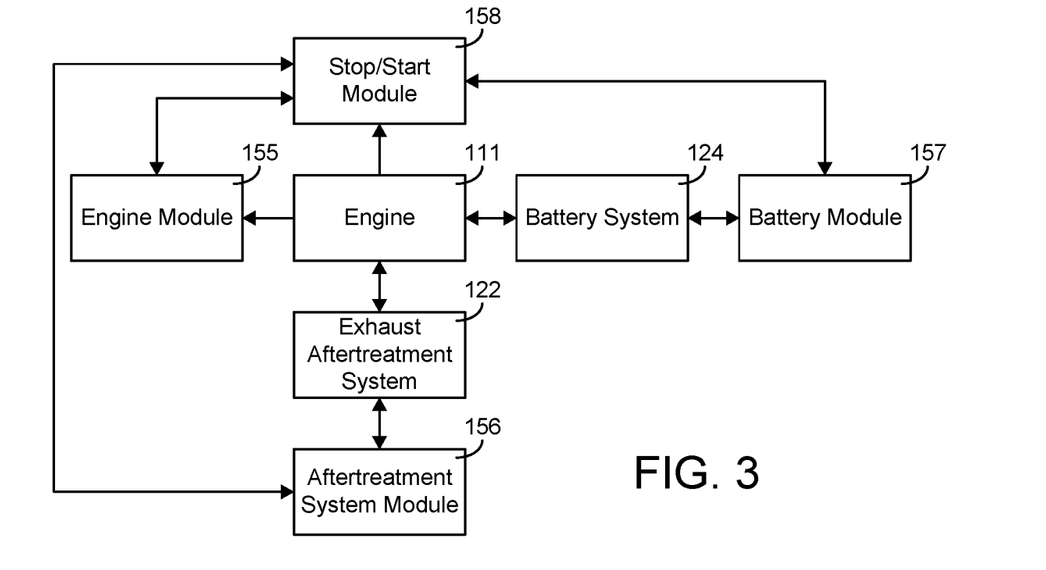
FIG. 3 is a schematic diagram of control modules of the controller of FIG. 2 in communication with components of the vehicle of FIG. 1, according to an example embodiment.

As shown in FIG. 3, the engine module 155 is in operative communication with the engine 111. The engine module 155 is structured to interpret engine operation data indicative of an operating characteristic of the engine 111. In one embodiment, as shown in FIG. 2, the engine module 155 is structured to receive and interpret engine temperature data 170 indicative of an operating temperature of the engine 111 acquired by one or one or more sensors (e.g., sensors 140). Therefore, the engine module 155 may be communicably coupled to a temperature sensor of the engine 111. The engine temperature data 170 may be used to determine whether the engine temperature (e.g., temperature of the engine block, temperature of engine oil, etc.) has stabilized at a warm-up temperature (e.g., a standard operating temperature, above a minimum engine temperature threshold, etc.) following an engine warm up period (e.g., after a cold start of the engine 111, to reduce engine friction during stop/start events, etc.).

In another embodiment, the engine module 155 is structured to determine whether the engine temperature has stabilized above a minimum engine temperature threshold based on a total engine run time since starting the engine 111. For example, the controller 150 via the engine module 155 may determine the engine temperature (e.g., via algorithms, estimations, look-up tables, etc.) based on the run time of the engine 111 and other internal/external characteristics (e.g., ambient temperature, engine speed, power output, etc.).

In one embodiment, the engine module 155 is structured to determine engine friction characteristics based on engine oil temperature to determine whether engine friction is less than an engine friction threshold, thereby facilitating a substantially easy engine restart after implementing the stop/start feature (e.g., requiring a low torque input required to start the engine 111, etc.). As such, the implementation of the stop/start feature may be based on the engine oil temperature. In one embodiment, the sensors 140 include an engine oil temperature sensor. In one embodiment, the engine oil temperature sensor may be configured to acquire data regarding the temperature of the engine oil. The viscosity of the engine oil, and thus the engine friction, is dependent on the temperature of the engine oil. Accordingly, the engine oil temperature may be used to provide an indication of the engine friction amount. In one embodiment, for example, a temperature of the engine oil that is substantially warm or hot correlates to the engine oil currently having a low viscosity, thereby indicating an engine friction low enough to implement the stop/start feature. The engine module 155 may be structured implement the stop/start feature based on any number of temperature measurement methods. For example, the engine module may be structured to implement the stop/start feature based on an engine coolant temperature, engine block temperature, engine head temperature, and/or engine manifold temperature. The start/stop feature may be implemented based on any direct or indirect temperature measurement device, including temperate measurement devices that can correlate with reduced engine start-up friction and normal combustion efficiency and emissions control.

In other embodiments, an engine oil temperature sensor may not be included. In one embodiment, the rotational friction of the engine 111 is determined by the amount of fueling required to idle the engine 111 at a constant speed (e.g., with an engine fuel gauge, etc.), which may indicate engine oil viscosity. The engine friction is then able to be determined based on the engine oil viscosity (e.g., via algorithms, estimations, look-up tables, etc.). In another embodiment, the engine 111 includes a positive displacement oil pump and an engine oil pressure sensor. The engine oil pressure sensor may be configured to acquire data regarding the pressure of the engine oil. With the positive displacement oil pump, the engine oil pressure becomes a function of pump speed (i.e., engine speed, etc.) and engine oil viscosity, providing an indication of engine friction. For example, warm or hot engine oil (i.e., oil with a low viscosity, etc.) may have a characteristically low engine oil pressure for a given engine speed. The engine friction may be determined by the controller 150 via the engine module 155 based on the engine oil pressure (e.g., via algorithms, estimations, look-up tables, etc.).

In some embodiments, the engine module 155 is further structured to receive and interpret the engine temperature data 170 to determine whether the engine temperature has stabilized at a temperature that is not excessively hot (e.g., the engine temperature is less than a maximum engine temperature threshold, etc.). For example, implementing the stop/start feature may cause engine damage through heat soak-back if the engine temperature is substantially high. In one embodiment, the engine temperature is compared to a maximum engine temperature threshold to determine whether the engine temperature exceeds the maximum engine temperature threshold. In some embodiments, for the stop/start feature to be implemented, the engine temperature lies within an engine operating temperature range (e.g., between the minimum engine temperature threshold and the maximum engine temperature threshold, etc.). As such, the implementation of the stop/start feature may be based on the engine temperature or the temperature of specific engine components (e.g., compression chamber, starter system, pistons, piston engine valves, etc.). In some embodiments, the implementation of the stop/start feature is based on the engine temperature of the engine 111 exceeding the minimum engine temperature threshold. In some embodiments, the implementation of the stop/start feature is based on the maximum engine temperature threshold exceeding the engine temperature. In some embodiments, the implementation of the stop/start feature is based on the engine temperature of the engine 111 exceeding the minimum engine temperature threshold, and based on the maximum engine temperature threshold exceeding the engine temperature.

In some embodiments, the engine module 155 is structured to determine whether the engine temperature has stabilized below the maximum engine temperature threshold (e.g., via algorithms, estimations, look-up tables, etc.) based on a total engine run time of the engine 111 since dropping below a threshold power level. For example, the engine 111 may be run at a high power output above the threshold power level for a duration of time such that the engine temperature exceeds the maximum engine temperature threshold. This may prohibit the stop/start feature from being implemented in order to prevent damage to the engine 111 (e.g., from heat-soak, etc.). As such, based on the total run time of the engine 111 below the threshold power level, the engine temperature may stabilize below the maximum engine temperature threshold, facilitating the implementation of the stop/start feature (e.g., if other inhibiting conditions are not present or activated, etc.).

As shown in FIG. 3, the aftertreatment system module 156 may be in operative communication with the exhaust aftertreatment system 122 that may be coupled to the engine 111 (i.e., the exhaust aftertreatment system 122 receives exhaust gas from the engine 111, etc.). The aftertreatment system module 156 is structured to interpret exhaust aftertreatment operation data indicative of an operating characteristic of the exhaust aftertreatment system 122. In one embodiment, as shown in FIG. 2, the aftertreatment system module 156 is structured to receive and interpret aftertreatment temperature data 172 indicative of a temperature of the exhaust aftertreatment system 122 and/or exhaust gas acquired by one or one or more sensors such as sensors 140. In one embodiment, the sensors 140 include an exhaust aftertreatment temperature sensor configured to acquire the aftertreatment temperature data 172 regarding the temperature of the exhaust aftertreatment system 122 (e.g., DPF inlet, SCR, etc.) and/or the exhaust gas.

The aftertreatment temperature data 172 may be compared to an exhaust aftertreatment temperature threshold to determine whether the exhaust aftertreatment temperature is sufficient (e.g., above the exhaust aftertreatment temperature threshold, etc.) to support required chemical reactions (e.g., to reduce emissions, etc.). In one embodiment, for example, many engine operating points are set to be in compliance with one or more vehicular laws (e.g., emissions, etc.). However, during a warm-up period, the engine 111 may experience its highest temperature transients, and certain emissions control devices, such as the exhaust aftertreatment system 122, may therefore perform sub-optimally (e.g., do not always comply with the emission regulations, etc.). By stopping the engine 111 during the warm-up period, the vehicle 100 may operate in a state of non-compliance with the one or more vehicular laws for a longer period of time during subsequent start-ups. As such, in some embodiments, the implementation of the stop/start feature may be based on the exhaust aftertreatment temperature exceeding the exhaust aftertreatment temperature threshold. For example, a low exhaust temperature may indicate that the exhaust aftertreatment system 122 is not operating at a desired temperature, and may thereby prevent the implementation of the stop/start feature (e.g., activating an inhibiting condition, etc.).

As shown in FIG. 3, the battery module 157 may be in operative communication with the battery system 124 be coupled to the engine 111 (i.e., the battery system 124 powers various electronic components of the engine 111, etc.). The battery module 157 is structured to interpret battery operation data indicative of an operating characteristic of the battery system 124. In one embodiment, as shown in FIG. 2, the battery module 157 is structured to receive and interpret energy data 174 indicative of a charge level of the battery system 124 (e.g., acquired by one or one or more sensors 140, etc.). The energy data 174 may be compared to a charge threshold to determine whether the battery system has sufficient stored energy (e.g., above the charge threshold, etc.) to support a restart of the engine 111 after a stop command (e.g., automatically turning off the engine 111 in response to a stopping event, etc.). As such, in some embodiments, the implementation of the stop/start feature may be based on the charge level of the battery system 124 exceeding the charge threshold. For example, a low energy storage may indicate that the battery system 124 may not support an engine restart, which may then prevent the implementation of the stop/start feature (e.g., activating an inhibiting condition, etc.).

As shown in FIG. 3, the stop/start module 158 may be operatively coupled to the engine 111, the engine module 155, the aftertreatment system module 156, and/or the battery module 157, among other modules and components. The stop/start module 158 is structured to interpret vehicle operation data indicative of operating characteristics of the vehicle 100, the engine 111, the exhaust aftertreatment system 122, the battery system 124, and the like. The stop/start module 158 is further structured to enable the stop/start feature of the engine 111 (e.g., permit shutting off the engine 111 is response to a stopping event, etc.) or disable the stop/start feature of the engine 111 (e.g., inhibit shutting off the engine 111 is response to a stopping event, etc.) based on the operation data (e.g., the charge level of the battery system 124, the temperature of the exhaust aftertreatment system 122, the operating temperature of the engine 111, an actual stop ratio, a distance traveled and speed between subsequent stopping events, etc.) and various operating parameters (e.g., the charge threshold, the operating temperature range of the engine 111, the exhaust aftertreatment system temperature threshold, a target/predetermined stop ratio, a distance threshold, a speed threshold, etc.). When the stop/start feature is enabled, the stop/start module 158 is structured to turn off the engine 111 for at least a portion of time in response to the vehicle 100 experiencing a stopping event (e.g., the vehicle 100 coming to a stop at a red light, a stop sign, etc.). Conversely, the stop/start module 158 is structured to inhibit the engine 111 from turning off in response to the vehicle 100 experiencing a stopping event when an inhibiting condition is present/activated based on the operation data indicating an operating parameter is not met.

As shown in FIG. 2, the stop/start module 158 includes a ratio module 159 and an inhibiting module 160. The ratio module 159 is structured to receive and interpret stopping data 176 indicative of a number of stops events the vehicle experiences (e.g., in response to an operator actuating a brake pedal, etc.). The stopping data 176 may also indicate a number of times the engine 111 has been turned off in response to the stopping events. The stopping data 176 may also indicate a total distance traveled by the vehicle 100 and the engine 111, and/or a number of hours of operation of the engine 111. The ratio module 159 is further structured to determine an actual stop ratio (e.g., a cumulative number of engine stops per hour of operation or distance traveled, etc.) for the engine 111. The actual stop ratio may be based on at least one of a number of times the engine 111 is turned off in response to the occurrence of stopping events, and any of a number of measures related to the useful life or wear and tear on the engine such as the distance traveled (e.g., miles, kilometers, etc.) by the vehicle 100 and/or engine 111, a number of hours since the purchase date of the engine 111, and a number of hours of operation of the engine 111. The actual stop ratio indicates a number of times the engine 111 is turned off in response to a stopping event for a total distance traveled or a total number of hours of operation of the engine 111 over the engine's lifetime. For example, the vehicle 100 may have been driven for 20,000 miles and over the 20,000 miles the stop/start module 158 turned off the engine 111 in response to a stopping event 10,000 times. Therefore, in this example, the actual stop ratio for the engine 111 is 1:2 (i.e., the engine 111 is turned off approximately every 2 miles).

The ratio module 159 is structured to compare the actual stop ratio to a target stop ratio. In one embodiment, the target stop ratio is predefined within the controller 150. In an alternative embodiment, an operator may provide the target stop ratio via the operator I/O device 130. In one embodiment, the target stop ratio is based on at least one of an expected life of the engine 111 (e.g., 6 years, 10 years, 15 years, etc.), an expected life of the engine 111 in distance traveled (e.g., 200,000 miles; 350,000 kilometers; etc.), and an expected life of the engine 111 in hours (e.g., 10,000 hours; 20,000 hours; etc.). In some embodiments, the target stop ratio is based on at least one of a term of a warranty (e.g., 3 years, 5 years, 10 years, etc.), a distance traveled covered by the warranty (e.g., 36,000 miles; 50,000 miles; 85,000 kilometers; etc.), a number of hours of calendar time covered by the warranty, and a number of hours of engine run time covered by the warranty (e.g., 5,000 hours; 7,500 hours; 10,000 hours; etc.). The target stop ratio may also be based on a number of starts the engine 111 is designed for. For example, an engine may be designed to withstand 50,000 total starts. If the engine 111 is warrantied for 50,000 miles, the target stop ratio for the engine in this example is 1:1 (i.e., the engine 111 may be turned off an average of one time per mile).

The inhibiting module 160 is structured to determine whether an inhibiting condition needs to be activated to disable the stop/start feature of the engine 111. A first inhibiting condition is based on the actual stop ratio being greater than the target stop ratio at a beginning of a driving event. According to an example embodiment, a driving event comprises a period defined by when the engine 111 is manually turned on by an operator to when the engine 111 is manually turned off by the operator. Manually turning on or turning off the engine 111 may include turning a key in an ignition, actuating a turn on/turn off button within the vehicle 100, pressing a start/stop button on a key remote, and/or any other way the engine 111 may be turned on or off by an operator (i.e., not automatically by the controller 150 in response to a stopping event, etc.).

The first inhibiting condition may be activated in response to the actual stop ratio for the engine 111 being greater than the target stop ratio at the beginning of the driving event. The first inhibiting condition may remain activated until the actual stop ratio of the engine 111 becomes less than the target stop ratio. For example, the actual stop ratio may be 1.1:1 and the target stop ratio may be 1:1 at the beginning of the driving event. Therefore, the stop/start feature is disabled by the stop/start module 158 during the driving event until the actual stop ratio reduces to become less than 1:1. If the actual stop ratio does not decease below the target stop ratio during the driving event, the stop/start module 158 disables the stop/start feature in each subsequent driving event until the actual stop ratio becomes less than the target stop ratio. However, the inhibiting module 160 is structured to not activate the first inhibiting condition in response the actual stop ratio increasing to be greater than the target stop ratio during a driving event if at the beginning of or if at any time during the driving event the actual stop ratio was less than the target stop ratio. Therefore, the stop/start module 158 is structured to keep the stop/start feature enabled during the driving event to maintain a consistent stop/start logic that does not cause the operator to believe the vehicle 100 may be operating improperly (e.g., by keeping the stop/start feature activated during a driving event where the stop/start feature may have already been implemented in response to a stopping event, the first inhibiting condition may be activated in a subsequent driving event if the actual stop ratio is greater than the target stop ratio at the end of a prior driving event, etc.).

A second inhibiting condition is based on the charge level of the battery system 124 being less than the charge threshold. For example, the battery system 124 may be depleted to an energy level below the charge threshold such that the battery system 124 cannot facilitate the restarting of the engine 111. Therefore, the stop/start module 158 may disable the stop/start feature until the battery system 124 charges to a level above the charge threshold. Thus, the second inhibiting event may be activated when the charge level of the battery system 124 is below the charge threshold.

A third inhibiting condition is based on the operating temperature of the engine 111 being outside of the operating temperature range (e.g., below the minimum engine temperature threshold, above the maximum engine temperature threshold, etc.). By way of example, when the engine temperature is below the minimum engine temperature threshold (e.g., during a warm-up period, etc.), engine friction increases which thereby increases the torque and electrical energy required to restart the engine 111 after the stop/start feature is implemented. Thus, the third inhibiting condition may be activated when the temperature of the engine 111 is below the minimum engine temperature threshold. By way of another example, when the engine temperature is above the maximum engine temperature threshold, shutting the engine 111 off during a stopping event may cause damage to various component of the engine 111 through heat soak. Thus, the third inhibiting condition may be activated when the temperature of the engine 111 is above the maximum engine temperature threshold.

A fourth inhibiting condition is based on the operating temperature of the exhaust aftertreatment system 122 being less than the exhaust aftertreatment system temperature threshold. For example, during a warm up period of the engine 111, the components of the exhaust aftertreatment system 122 may be at an operating temperature such that the exhaust aftertreatment system 122 may not comply with emission regulations. Therefore, allowing the engine 111 to turn off would further delay the exhaust aftertreatment system 122 from reaching an appropriate operating temperature. Thus, the fourth inhibiting condition may be activated when the temperature of the exhaust aftertreatment system is below the exhaust aftertreatment temperature threshold.

In some embodiments, the stop/start module 158 is structured to receive and interpret speed data 178 indicative of a maximum speed of the vehicle 100 between stopping events. A fifth inhibiting condition is based on the maximum speed of the vehicle 100 between stopping events being less than a speed threshold. The inhibiting module 160 may monitor the speed between stopping events to determine whether the vehicle 100 is in a traffic jam like condition or whether the operator is driving as such a condition exists (e.g., stop-and-go, etc.) such that the stop/start module 158 does not turn off the engine 111 when the vehicle 100 travels at a substantially slow speed (e.g., 5 miles per hour, 10 kilometers per hour, etc.). Thus, the fifth inhibiting event may be activated when the vehicle 100 operates when a maximum speed between stopping events is less than the speed threshold.

In additional embodiments, the stop/start module 158 is structured to receive and interpret distance data 180 indicative of a distance traveled between stopping events. A sixth inhibiting condition is based on the distance the vehicle 100 travels between stopping events being less than a distance threshold. The inhibiting module 160 may monitor the distance between stopping events to determine whether the vehicle 100 may be in a traffic jam like condition or whether the operator is driving as such a condition exists (e.g., stop and go, etc.) such that the stop/start module 158 does not turn off the engine 111 when the vehicle 100 travels a substantially small distance (e.g., 5 feet, 25 feet, etc.) before stopping. Thus, the sixth inhibiting event may be activated when the distance between two consecutive stopping events is less than the distance threshold.

The inhibiting module 160 may be structured to activate one or more of the aforementioned inhibiting conditions. It should be understood that the inhibiting module 160 may be structured to activate an inhibiting condition based on other factors than described above. The inhibiting conditions may be activated at the beginning of a driving event (i.e., during an engine warm up period, an aftertreatment system warm up period, etc.) and deactivated once the engine 111 reaches typical operating conditions (e.g., engine operating temperature, exhaust aftertreatment system operating temperature, etc.). For example, when the actual stop ratio is greater than the target ratio at the beginning of the driving event, the first inhibiting condition may be activated along with the third and fourth inhibiting conditions (e.g., if the engine 111 starts from a cold start at the beginning of a driving event, etc.). When the engine 111 and the exhaust aftertreatment system 122 reach operating temperatures, the third and fourth inhibiting conditions may be deactivated. The first inhibiting condition may remain active until the actual stop ratio decreases to less than the target stop ratio. Therefore, if the actual stop ratio remains above the target stop ratio following the warm up period of the engine 111 and the exhaust aftertreatment system 122, the stop/start feature remains disabled until the first inhibiting condition can be deactivated in response to the actual stop ratio decreasing below the target stop ratio, thereby increasing the "warm-up period" of the engine 111. Extending the warm-up period of the engine to inhibit automatically stopping and restarting the engine may provide an operator of the vehicle with an impression that the stop/start logic is consistent and is working properly.

Figure 4:
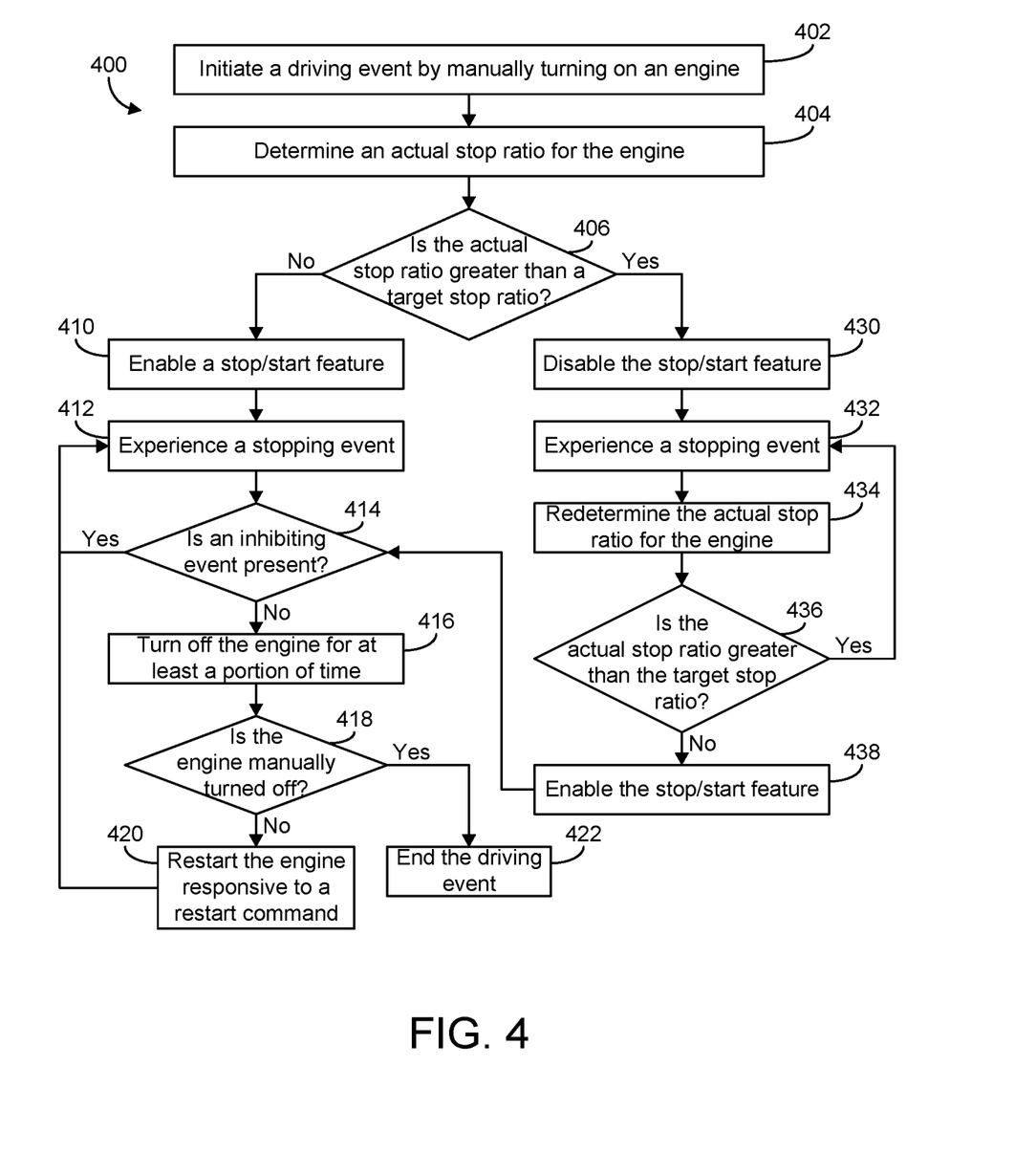
FIG. 4 is a flow diagram of a method of managing automatic stop/start frequency of an engine, according to an example embodiment.

Referring now to FIG. 4, a method 400 of managing automatic stop/start frequency of an engine is shown according to an example embodiment. In one example embodiment, method 400 may be implemented with the controller 150 and the various modules of FIGS. 1-3. As such, method 400 may be described with regard to FIGS. 1-3.

At process 402, a driving event is initiated in response to an engine (e.g., the engine 111, etc.) being manually turned on (e.g., with a key, push start, etc.) by an operator. At process 404, the controller 150 determines an actual stop ratio for the engine at the start of the driving event. At process 406, the controller 150 determines whether the actual stop ratio is greater than a target stop ratio. If the actual stop ratio is less than the target stop ratio, the controller 150 enables a stop/start feature (process 410). Conversely, if the actual stop ratio is greater than the target stop ratio, the controller 150 disables the stop/start feature (process 430).

If the stop/start feature is enabled at the beginning of the driving event (process 410), the actual stop ratio does not affect the application of the stop/start feature until subsequent driving events (e.g., if the actual stop ratio becomes greater than the target stop ratio during the first driving event, the stop/start feature is not disabled until a second driving event, etc.). Therefore, the actual stop ratio may increase above the target stop ratio during a driving event without affecting the stop/start feature for the current driving event. At process 412, the engine experiences a stopping event (e.g., a vehicle comes to a red light, a stop sign, the operator presses a brake pedal till the vehicle comes to a rest, etc.). At process 414, the controller 150 determines whether an inhibiting condition is present (e.g., the charge level of the battery system 124 being less than the charge threshold, the operating temperature of the engine 111 being outside of the operating temperature range, the operating temperature of the exhaust aftertreatment system 122 being less than the exhaust aftertreatment system temperature threshold, the maximum speed of the vehicle 100 between stopping events being less than a speed threshold, the distance the vehicle 100 travels between stopping events being less than a distance threshold, etc.). If an inhibiting condition is present, the controller 150 keeps the engine running and returns to process 412 where the controller 150 waits for the engine to experience another stopping event. The controller 150 then repeats process 414 to determine if the same or another inhibiting condition is present during the subsequent stopping event.

If an inhibiting condition is not present, the controller 150 turns off the engine for at least a portion of time (process 416). At process 418, the controller 150 determines whether the engine is manually turned off by an operator during the stopping event. If the engine is not manually turned off and the controller 150 receives a restart command (e.g., from an operator pressing an accelerator pedal, putting the vehicle in drive, etc.), the controller 150 restarts the engine responsive to the restart command (process 420). The controller 150 then repeats processes 412-420 until the engine is manually turned off during a stopping event, at which time the controller 150 ends the driving event (process 422).

If the stop/start feature is disabled at the beginning of the driving event (process 430), the actual stop ratio affects the application of the stop/start feature during the current driving event (and potentially subsequent driving events). At process 432, the engine experiences a stopping event. At process 434, the controller 150 determines the actual stop ratio for the engine in response to the stopping event. At process 436, the controller 150 determines whether the actual stop ratio is greater than the target stop ratio. If the actual stop ratio is less than the target stop ratio, the controller 150 enables the stop/start feature (process 438) and continues onto process 414. Conversely, if the actual stop ratio is still greater than the target stop ratio, the controller 150 keeps the stop/start feature disabled and the controller 150 returns to process 432 where the controller 150 waits for the engine to experience another stopping event and then repeats processes 434-436.

Figure 5:
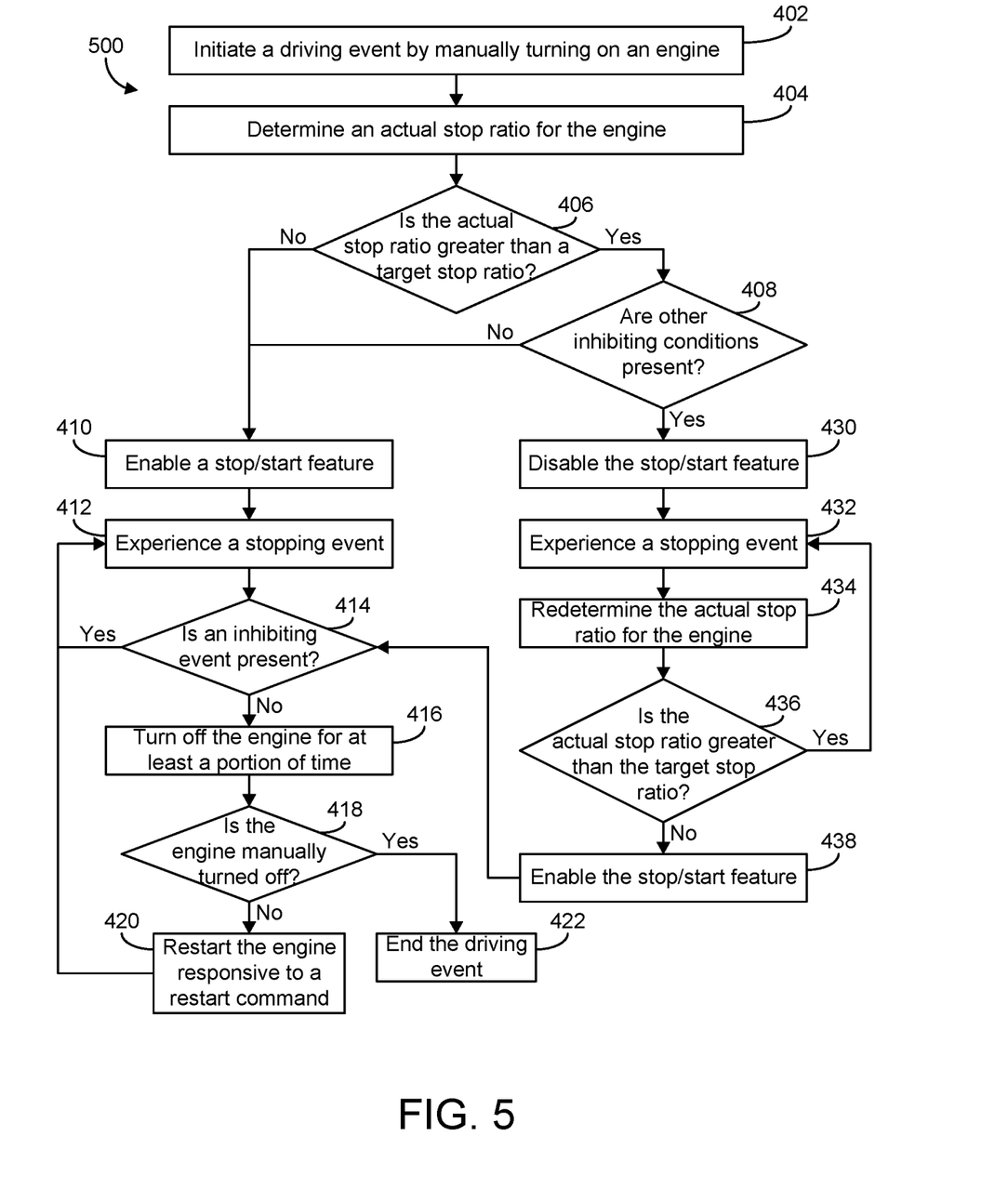
FIG. 5 is a flow diagram of a method of managing automatic stop/start frequency of an engine, according to another example embodiment.
Figure 6:
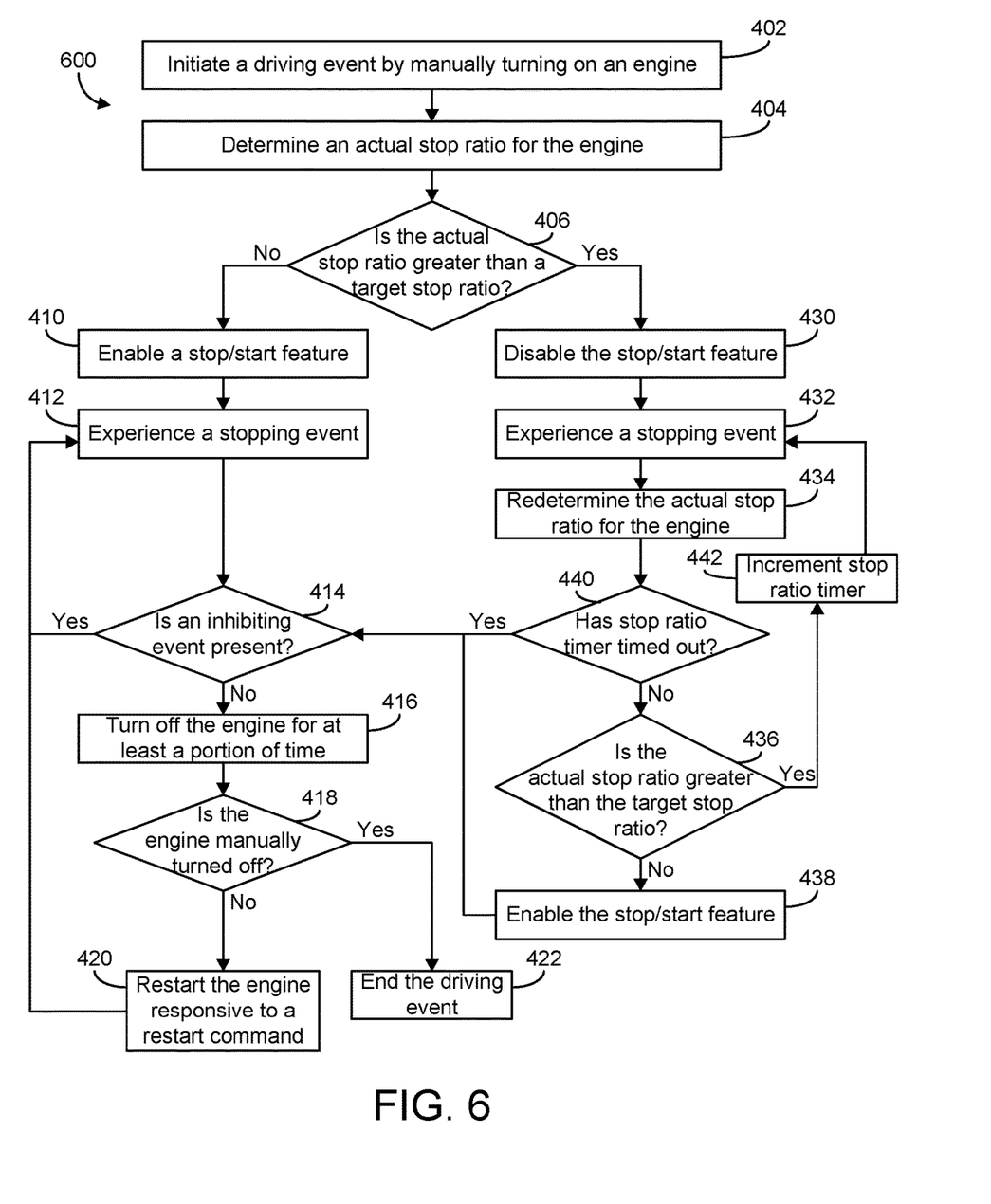
FIG. 6 is a flow diagram of a method of managing automatic stop/start frequency of an engine, according to yet another example embodiment.

Referring now to FIGS. 5 and 6, method 500 and method 600 for managing automatic stop/start frequency of an engine are shown according to additional example embodiments. In some example embodiment, method 500 and method 600 may be implemented with the controller 150 and the various modules of FIGS. 1-3. In some example embodiments, certain steps of method 500 and method 600 may be implemented similar to method 400. As such, method 500 and method 600 are described with regard to FIGS. 1-3 and method 400.

Referring specifically now to FIG. 5, method 500 includes each process of FIG. 4 in addition to process 408. In method 500, if the controller 150 determines that the actual stop ratio is not greater than a target stop ratio at process 406, the controller 150 enables a stop/start feature at process 410. At process 406, if the controller 150 determines that the actual stop ratio is greater than a target stop ratio at process 406, the controller 150 determines whether other inhibiting conditions are present at step 408. If other inhibiting conditions are determined to not be present at step 408, the controller 150 enables a stop/start feature at process 410. Conversely, if other inhibiting conditions are determined to be present at step 408, the controller 150 disables the stop/start feature at process 430. For example, in one embodiment, if the controller 150 determines that the actual stop ratio is greater than a target stop ratio and that the engine is in an engine warm up period (i.e., another inhibiting condition is present), the controller 150 disables the stop/start feature.

Referring specifically now to FIG. 6, method 600 includes each process of FIG. 4 in addition to process 440 and process 442. In method 600, the controller 150 determines whether the actual stop ratio is greater than the target stop ratio at process 436. If the actual stop ratio is less than the target stop ratio, the controller 150 enables the stop/start feature at process 438 and continues onto process 414. Conversely, if the actual stop ratio is greater than the target stop ratio at process 436, the controller 150 implements an increment stop ratio timer at process 442 and returns to process 432 where the controller 150 waits for the engine to experience another stopping event. After experiencing another stopping event, the controller 150 again determines the actual stop ratio for the engine in response to the stopping event at process 434. Next, at process 440, the controller 150 determines whether the stop ratio timer has timed out. If the stop ratio timer has not timed out, the controller 150 again determines whether the actual stop ratio is greater than the target stop ratio at process 436. Conversely, if the stop ratio timer has timed out, the controller 150 continues onto process 414. For example, the stop ratio timer may delay the controller 150 from carrying out the rest of method 600 for the duration of a time period or may limit the inhibiting of the stop/start feature to a maximum time period. In some embodiments, the duration of the time period may be based on at least one of a magnitude of the difference between the actual stop ratio and the target stop ratio, an engine operation parameter, at least one term of a warranty, a time between stopping events, and any number of other criteria.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus, comprising:
a start/stop circuit structured to:
determine a target start/stop ratio for an engine based on an operating parameter;
determine an actual start/stop ratio for the engine based on a determined number of times that the engine is turned off in response to a determined number of stopping events;
activate an inhibiting condition in response to the actual stop ratio being greater than the target stop ratio at a beginning of a driving event; and
prevent the engine from turning off during a stop event in response to determining that the inhibiting condition is active and that a stopping event has occurred.

2. The apparatus of claim 1, wherein the operating parameter is based on at least one of an expected life of the engine, an expected life of the engine in distance traveled, an expected life of the engine in hours since purchase date, and an expected life of the engine in operating hours.

3. The apparatus of claim 1, wherein the operating parameter is based on at least one of a term of a warranty, a distance traveled covered by the warranty, a number of hours of calendar time covered by the warranty, and a number of hours of engine run time covered by the warranty.

4. The apparatus of claim 1, wherein the actual stop ratio is further based on at least one of a distance traveled, a number of hours since engine purchase, and a number of hours of operation of the engine.

5. The apparatus of claim 1, wherein the driving event comprises a period defined by when the engine is manually turned on by an operator to when the engine is manually turned off by the operator.

6. The apparatus of claim 1, wherein the inhibiting condition is activated at the beginning of the driving event in response to the actual stop ratio for the engine being greater than the target stop ratio at the beginning of the driving event, and remains activated during the driving event until the actual stop ratio of the engine becomes less than the target stop ratio.

7. The apparatus of claim 1, wherein the inhibiting condition is not activated in response to the actual stop ratio becoming greater than the target stop ratio during the driving event.

8. The apparatus of claim 1, further comprising a battery circuit in operative communication with a battery system, the battery circuit structured to interpret energy data indicative of a charge level of the battery system, wherein the inhibiting condition is activated further based on the charge level of the battery system being less than a charge threshold.

9. The apparatus of claim 1, further comprising an engine circuit in operative communication with the engine, the engine circuit structured to interpret engine operation data indicative of an operating characteristic of the engine, wherein the operating characteristic of the engine includes an operating temperature of the engine, and wherein the inhibiting condition is activated based on the operating temperature of the engine being outside of an operating temperature range.

10. The apparatus of claim 1, further comprising an aftertreatment system circuit in operative communication with an exhaust aftertreatment system, the exhaust aftertreatment system in exhaust gas receiving communication with the engine, wherein the aftertreatment system circuit is structured to interpret exhaust aftertreatment operation data indicative of operating characteristics of the exhaust aftertreatment system.

11. The apparatus of claim 10, wherein the operating characteristics of the exhaust aftertreatment system include an operating temperature of the exhaust aftertreatment system, and wherein the inhibiting condition is activated based on the operating temperature of the exhaust aftertreatment system being less than a temperature threshold.

12. The apparatus of claim 1, wherein the start/stop circuit is further structured to at least one of (i) monitor a distance traveled between stopping events, and (ii) monitor a maximum speed between the stopping events, and wherein the inhibiting condition is activated based on the distance traveled between the stopping events being less than a distance threshold and the maximum speed between the stopping events being less than a speed threshold.

13. A method, comprising:
   determining a target start/stop ratio for an engine based on an operating parameter;
   determining an actual start/stop ratio for the engine based on a determined number of times that the engine is turned off in response to a determined number of stopping events;
   activating an inhibiting condition in response to the actual stop ratio being greater than the target stop ratio at a beginning of a driving event; and
   preventing the engine from turning off during a stop event in response to determining that the inhibiting condition is active and that a stopping event has occurred.

14. The method of claim 13, wherein the operating parameter is based on at least one of an expected life of the engine, an expected life of the engine in distance traveled, an expected life of the engine in hours since purchase date, and an expected life of the engine in operating hours.

15. The method of claim 13, wherein the inhibiting condition is based on at least one of an engine warm up period, an aftertreatment system warm up period, and a battery system charge level.

16. The method of claim 13, wherein the engine is further inhibited from temporarily turning off during a first portion of a driving event, and wherein the engine is no longer inhibited from temporarily turning off during a second portion of the driving event in response to the actual stop ratio becoming less than the target stop ratio.

17. An apparatus, comprising:
   a start/stop circuit structured to:
      activate an inhibiting condition in response to determining at least one of an actual stop ratio greater than a target stop ratio, a charge level of a battery system less than a charge threshold, a temperature below an operating temperature range, and a parameter of an engine between stopping events being less than a predefined threshold; and
      prevent the engine from turning off during a stop event in response to determining that the inhibiting condition is active and that a stopping event has occurred.

18. The apparatus of claim 17, wherein the driving event comprises a period defined by when the engine is manually turned on by an operator to when the engine is manually turned off by the operator.

19. The apparatus of claim 17, wherein the inhibiting condition is activated at the beginning of the driving event and remains activated during the driving event until the actual stop ratio becomes less than the target stop ratio, the charge level of the battery system becomes greater than the charge threshold, the temperature is within the operating temperature range, and/or the parameter of the engine between stopping events is more than the predefined threshold.

20. The apparatus of claim 17, wherein the temperature is a temperature of the engine or the temperature of an exhaust aftertreatment system in exhaust gas communication with the engine and/or the parameter of the engine between stopping events is an engine speed and/or a distance travelled.

* * * * *